United States Patent [19]

Seiz et al.

[11] Patent Number: 4,582,188

[45] Date of Patent: Apr. 15, 1986

[54] SPEED CONTROLLER FOR PALLETS

[75] Inventors: Carl G. Seiz, Hatfield; Clyde G. Robinson, Lansdale, both of Pa.

[73] Assignee: Variable Control Systems, Inc., Telford, Pa.

[21] Appl. No.: 704,285

[22] Filed: Feb. 22, 1985

[51] Int. Cl.4 .............................................. B60T 8/22
[52] U.S. Cl. .................................... 193/40; 193/35 C; 193/37; 188/72.7; 188/83; 188/84; 188/195
[58] Field of Search ...................... 193/35 R, 35 A, 37, 193/40, 35 B, 35 C; 188/71.1, 83, 174, 195, 84, 72.7; 192/7

[56] References Cited

U.S. PATENT DOCUMENTS 2,481,028 9/1949 Lear ................................. 188/84 X Primary Examiner—Jeffrey V. Nase
Assistant Examiner—Mary Beth O. Jones
Attorney, Agent, or Firm—Howson and Howson

[57] ABSTRACT

The speed of a pallet as it descends down a pair of inclined rails in a flow rack is controlled by a series of speed-control wheels mounted on axles fastened to frame members located underneath the pallet. A tapered roller bearing is interposed between each axle and wheel to mount the wheel for combined rotary motion and axial motion. Brake pads are mounted on the frame member for engaging a braking surface on the wheel as it moves axially in response to the pallet load. The brake pads apply friction to the wheel for slowing the speed of the pallet. A bar is provided adjacent the lower end of each rail for engaging the speed control wheels on the pallets to increase the axial pressure thereon and to increase friction for arresting the pallets and separating the same.

22 Claims, 9 Drawing Figures

SPEED CONTROLLER FOR PALLETS

FIELD OF THE INVENTION

The present invention relates to speed control devices for pallets, and more particularly, the present invention relates to devices for use in combination with pallets to control the speed with which the pallets descend on inclined rails in a flow rack.

BACKGROUND OF THE INVENTION

A so-called flow rack system customarily comprises a series of columns between which are mounted a pair of inclined rails extending between a higher level loading station and a lower level unloading station. Loaded pallets are placed in the rack at the higher level loading station and are withdrawn therefrom at the lower level unloading station after having travelled downwardly on the rails. Various types of speed controllers have been proposed for regulating the speed with which a loaded pallet advances on rails in flow racks.

BRIEF DESCRIPTION OF THE PRIOR ART

U.S. Pat. No. 4,234,069, assigned to the assignee of the present application, discloses a speed control device which is particularly suited for use in controlling the speed of a pallet as it advances down inclined rails in a flow rack. In one embodiment of the patented device, speed control is achieved by means of speed control assemblies mounted to the underside of a pallet. Each speed control assembly includes a pair of speed control wheels which are mounted for combined axial and rotary motion on an axle carried in a housing. The speed control wheels have tapered surfaces which ride on an inverted U-shaped inclined rail and have braking surfaces opposite the tapered surfaces. The braking surfaces engage a series of brake pads mounted in the wheel housing when the pallet is loaded and the wheels are forced axially outward into engagement with the brake pads. With this structure, heavier loads on the pallet increase the outward pressure between the wheels and the brake pads to increase friction for automatically controlling the speed of the pallet irrespective of the load carried thereon. The loaded pallet is arrested adjacent to the lower end of the rails by means of a wedge that engages between the wheels close to the axle for increasing outward pressure on the brake pads.

The speed control device disclosed in the aforementioned patent is simple yet effective in operation. Notwithstanding its simplicity, however, there is a need for a pallet speed controller which is even simpler in construction and even less expensive to manufacture and which is capable of operating on conventional L-shaped rails such as found in existing flow racks.

OBJECTS OF THE INVENTION

With the foregoing in mind, a primary object of the present invention is to provide a novel pallet speed controller which constitutes an improvement on the speed controller disclosed in U.S. Pat. No. 4,234,069.

Another object of the present invention is to provide a unique pallet speed controller which is particularly suited for use in conventional flow racks utilizing inclined rails of standard angle configuration.

A further object of the present invention is to provide a simple and reliable pallet speed controller which ensures accurate speed control irrespective of the load on the pallet yet which is relatively inexpensive to manufacture and maintain.

A still further object of the present invention is to provide means for controlling the speed of a pallet in a flow rack system and for arresting the pallet and separating it from a trailing pallet at the unloading station in a flow rack.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENT

Figure 1:
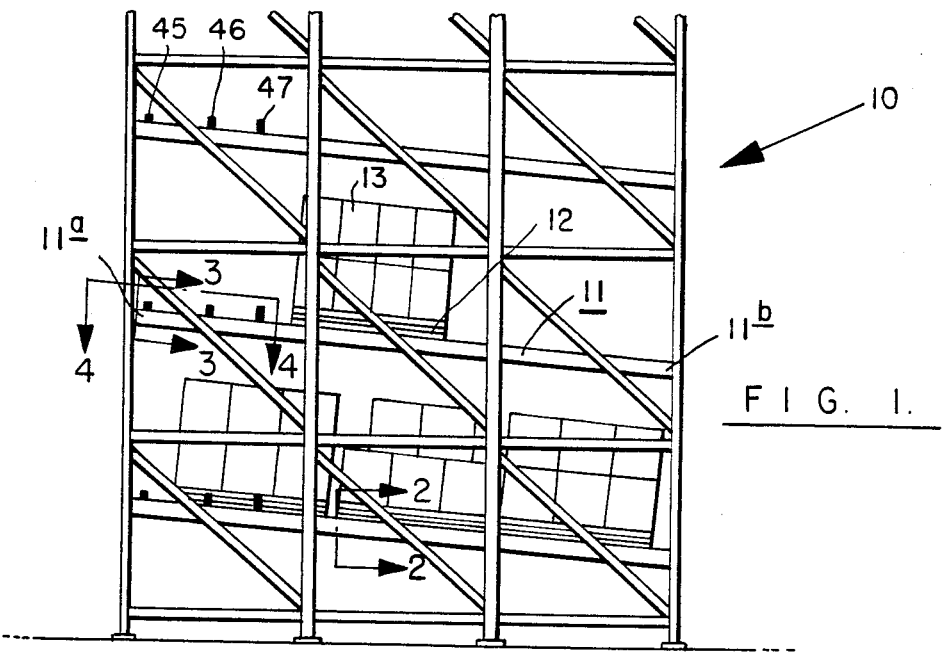
FIG. 1 is an elevational view of a flow rack in which pallet speed controllers embodying the present invention find particular utility.

Referring now to the drawings, FIG. 1 illustrates a so-called flow rack 10 in which pallet speed controllers of the present invention find particular utility. The flow rack 10 is characterized by a framework of columns and bracing mounting a series of inclined trackways at various levels, such as the trackway 11 which extends between an upper level 11a and a lower level 11b. Pallets, such as the pallet 12, carrying loads, such as boxed foodstuffs 13, are loaded onto the trackways 11 at the upper level 11a and are removed therefrom at the lower level 11b after having flowed downwardly on the trackway 11 under the influence of gravity.

Various devices have been proposed for controlling the speed with which the pallets 12 advance down the trackway 11 in the flow rack 10. A particularly desirable speed control device is disclosed in U.S. Pat. No. 4,234,069, assigned to the assignee of the present application. In addition to disclosing pallet speed control means, the patent discloses a mechanism for arresting the pallet when it reaches the lower end 11b of the trackway 11.

In the flow rack system described in the aforementioned patent, pallet speed control is achieved by means of speed controller assemblies each of which includes a pair of specially-shaped wheels mounted for combined rotation and axial motion on an axle carried in a housing mounted to the underside of the pallet. The wheels engage opposite corners of an inverted U-shaped rail and cooperate, when the pallet is loaded, to slide axially outward and apply pressure to brake pads carried outboard of the wheels in the wheel housing. The brake pads apply friction to the wheels for controlling the speed of the pallet as it advances.

In the aforementioned patented speed control apparatus, a pair of specially-shaped wheels cooperate with a special roll-formed guide rail to provide the desired degree of speed control. According to the present invention, however, the desired degree of speed control is obtained by utilizing a single wheel capable of running on a conventional rail such as used in conventional flow racks. As a result, conventional flow racks can be retrofitted to use pallets having speed controllers embodying the present invention.

Figure 7:
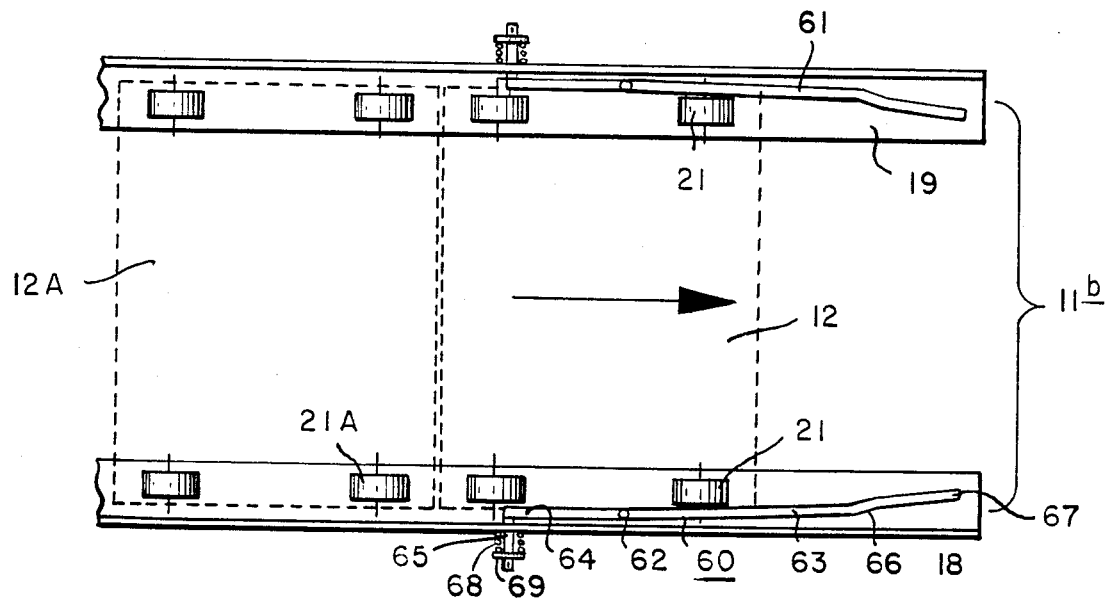
FIG. 7 is a plan view of pallet arresting and separating means located at the unloading station in the flow rack.

To this end, the pallet 12 utilizing the present invention comprises a deck, or load support member 15 having a generally rectangular plan configuration for supporting a load, such as the boxes 13 illustrated in FIG. 1. A series of speed control assemblies, such as the assemblies 16 and 17 are mounted to the underside of the deck 15 and are adapted to ride on rails provided by angle members 18 and 19, respectively which extend in spaced parallel relation to define the inclined trackway 11 illustrated in FIG. 1. The number of speed control assemblies utilized per pallet may vary depending on load to be carried, pallet size, etc. For instance, four assemblies may be mounted on each side, such as illustrated in phantom in FIG. 4, or two may be so mounted such as illustrated in FIG. 7. Each rail or angle member, such as the right hand rail 18, has a vertically disposed flange 18a and a horizontally disposed flange 18b. The rails 18 and 19 are arranged with their horizontal flanges extending toward one another and with their vertical flanges disposed outboard of the speed control assemblies 16 and 17.

Figure 2:
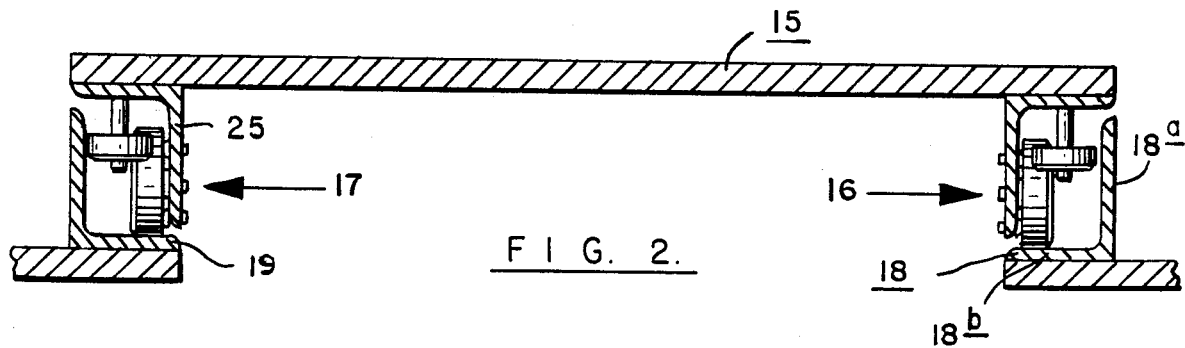
FIG. 2 is an enlarged sectional view taken on line 2—2 of FIG. 1 to illustrate the manner in which speed controllers of the present invention are mounted to a pallet.
Figure 5:
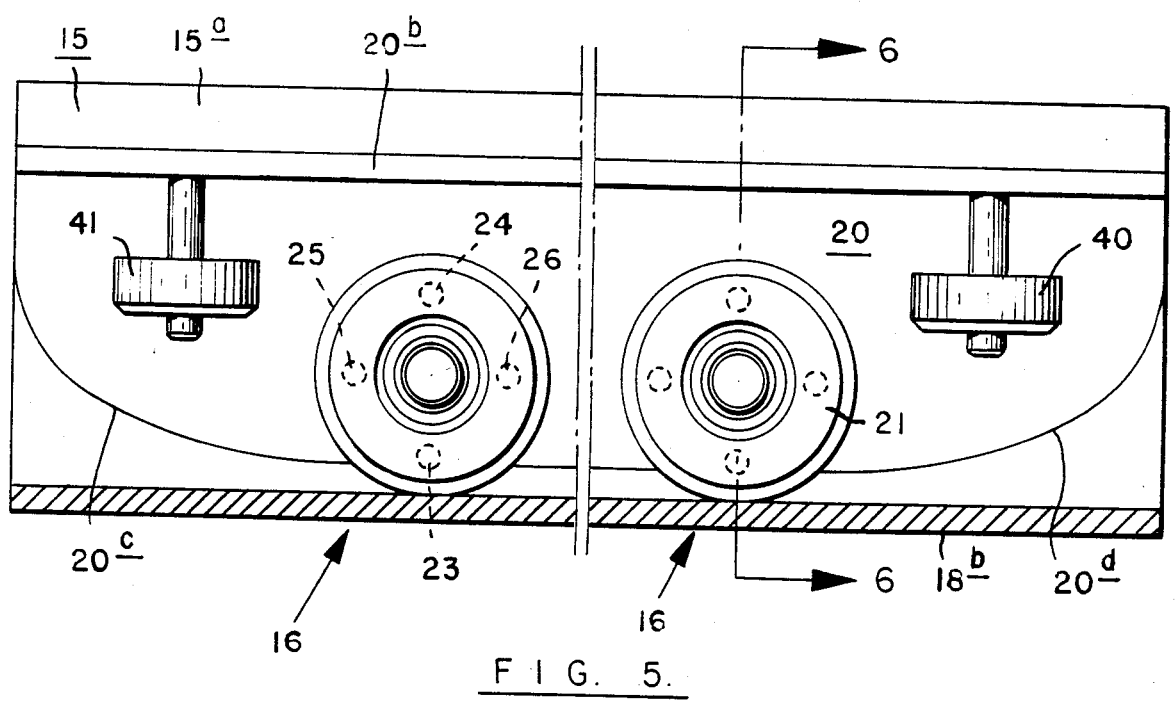
FIG. 5 is an enlarged, lengthwise foreshortened, sectional view to illustrate a pair of speed controller assemblies and guide wheels associated therewith at opposite ends of a pallet.
Figure 6:
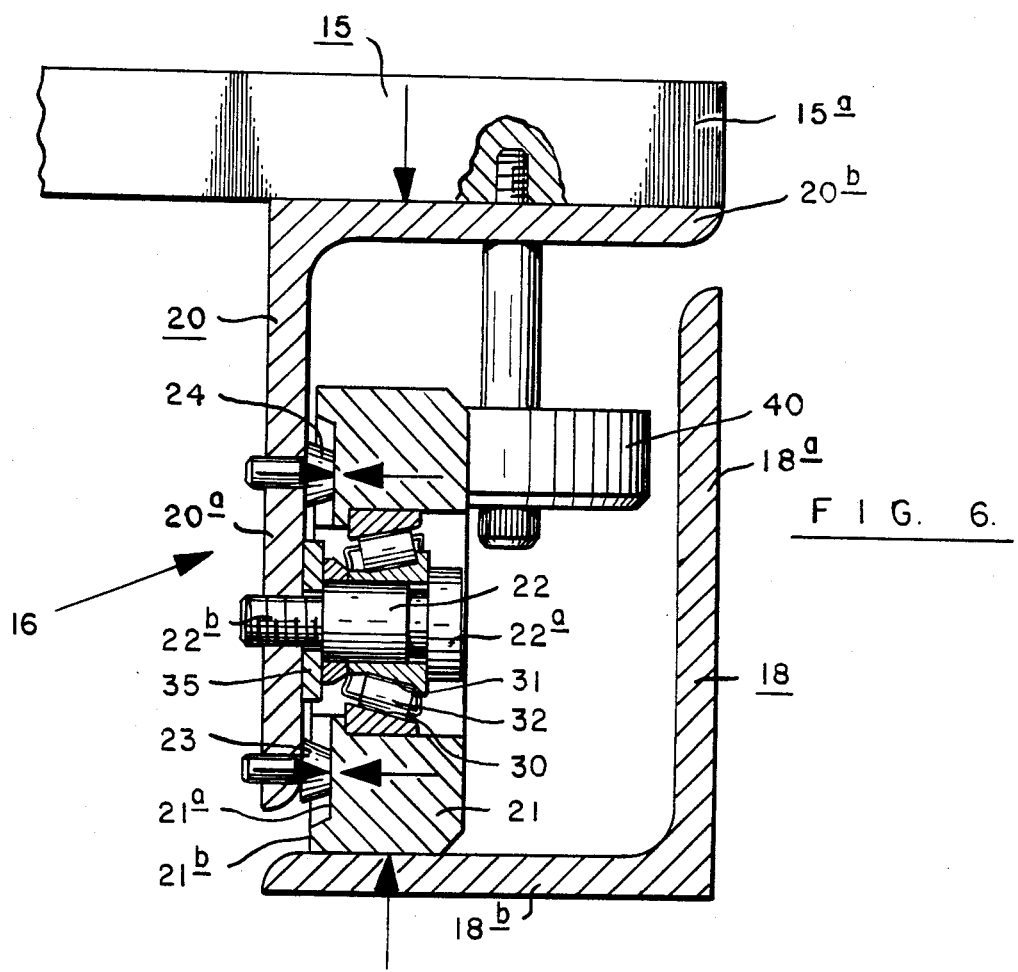
FIG. 6 is an enlarged sectional view taken on line 6—6 of FIG. 5 to illustrate certain structural details of a speed controller embodying the present invention.

As best seen in FIG. 6, each speed controller assembly, such as the right hand speed controller 16, comprises a frame 20 which, in the illustrated embodiment, is an elongated metal angle member formed of aluminum or steel having a vertical flange 20a and a horizontal flange 20b. The horizontal flange 20b is fastened to the underside of the deck 15 by bolts or other conventional fasteners (not shown), and the vertical flange 20a depends therefrom and is offset inwardly from the outer edge 15a of the deck 15. As seen in FIG. 2, the frame member 20 extends in spaced parallel relation with a like frame member 25 which mounts the companion speed controller assembly 17. Preferably, the frame members 20, 25 are elongated horizontally, and opposite ends of the depending flanges thereof are provided with curved edges 20c and 20d as illustrated in FIG. 5 on the frame member 20.

The speed controller assembly 16 includes a rotary member 21 which is disposed outboard of the vertical flange 20a of the frame member 20. Preferably, the rotary member 21 is a metal wheel having a circular periphery which rolls on the top surface of the horizontal flange 18b of the rail 18. The wheel 21 is mounted for rotation about a horizontal axis provided by an axle 22 extending outwardly in cantilever fashion from the vertical flange 20a of the frame member 20.

The speed of the pallet 12 as it advances down the trackway 11 is controlled by applying friction to the wheel 21 as it rotates. To this end, the wheel 21 is provided with an annular braking surface 21a confronting the vertical flange 20a of the frame member 20, and a series of brake pads 23-26 are mounted to the frame member flange 20a at spaced locations outwardly of the axis of rotation of the wheel 21. Preferably, as illustrated in FIG. 5, the braking surface 21a is recessed to locate the brake pads 23-26 closer to the vertical centerline of the wheel 21 and to define a peripheral flange 21b on the wheel 21, which flange 21b protects the brake pads 23-26 from damage, foreign matter, etc.

In the illustrated embodiment, the brake pads 23 and 24 are disposed in a vertical pair located on opposite sides of the axle 22, and a like pair of brake pads 25 and 26 are disposed horizontally on opposite sides of the axle 22. Each brake pad, such as the brake pad 24, has a truncated head with intersecting slits arranged in a cruciform pattern at its point of engagement with the braking surface 21. Preferably, each brake pad is molded of a plastic compound which includes a mixture of 80% Acetel, 10% Teflon, and 10% Silicon, sold under the trade designation KL4540 by Liquid Nitrogen Products of West Chester, Pennsylvania. Such compound has been found to provide a desirable degree of friction over a wide range of temperatures and loads.

According to the present invention, friction is applied by the brake pads 23-26 to the wheel 21 to retard the speed of the pallet 12 as it advances. The amount of the friction applied is directly related to the load on the pallet deck 15, so that the speed with which the pallet 12 advances down the inclined trackway 11 is accurately regulated, irrespective of the load it carries. For this purpose, the wheel 21 is mounted for both rotary motion and motion toward the brake pads 23-26 in response to a radially-directed load between the wheel 21 and the axle 22.

In the illustrated embodiment, such motion is provided by bearing means comprising an outer frusto-conical, or tapered, surface 30 provided in the wheel 21, and an inner frusto-conical, or tapered, surface 31 provided on the axle 22. Anti-friction means is interposed between the outer tapered surface 30 and the inner tapered surface 31 to mount the surfaces 30 and 31 for combined rotary and axial relative movement. In the present instance, the anti-friction means includes a plurality of rollers 32 interposed between the tapered surfaces 30 and 31, and the rollers 32 are provided by a conventional taper roller bearing having its outer raceway providing the tapered surface 30 and its inner raceway providing the inner tapered surface 31. The inclination of the tapered surfaces 30 and 31, and hence the rotational axis of each of the rollers 32, defines a conical surface of revolution having its apex located on the centerline of the axis 22 inboard of the braking pads 23-26. The included cone angle is 11°, and this has been found to provide a desirable measure of speed control when the trackway 11 has a pitch of ⅜" per foot. If the pallets are to run on trackways of greater pitch, the cone angle should also be greater to ensure the desired speed control.

In the illustrated embodiment, the inner raceway 31 is fixed to the axle 22, and the outer raceway 30 and wheel 21 move axially relative thereto. To afford such motion a spacer 35 is interposed between the end face of the inner raceway 31 and the frame flange 20a, and the axle 22 is provided by a conventional bolt or machine screw having a head 22a engaging the outer end face of the inner raceway 31 and a threaded shank 22b threaded into a bore provided in the depending frame flange 20a. Thus, the inner raceway 31 is secured against axial movement on the axle 22 while the outer raceway 30 and wheel 21 can move a slight distance axially relative thereto in response to radial loads on the wheel 21.

When a load is applied downwardly to the frame member 20, such as in the direction indicated by the arrow in FIG. 6, a reaction force is applied radially upward against the wheel 21 by the horizontal rail flange 18b. The radial force causes the wheel 21 to slide leftward a minute distance due to the angular disposition of the tapered surfaces 30 and 31 and the interposition therebetween of the anti-friction rollers 32. Leftward sliding motion of the wheel 21 is restrained, however, by the interengagement of the brake pads 23-26 with the braking surface 21a on the wheel 21. As a result, when the wheel 21 rotates under load, its braking surface 21a slides relative to the brake pads 23-26, and a friction force is applied to the wheel 21 tending to retard its rotation. This, in turn, controls the speed of the pallet 12 as it advances.

When a heavier load is placed on the pallet deck 15, the downward load on the frame member 20 increases, and the upward reaction force applied to the wheel 21 by the rail flange 18b increases. This, in turn, causes the wheel 21 to slide a further minute distance leftward to increase the pressure applied between its braking surface 21a and the brake pads 23-26, and hence to increase the friction forces applied to the wheel 21. Thus, it should be apparent that the magnitude of the braking force applied to the wheel 21 is directly related to the load carried by the pallet deck 15, and such load compensation is automatic, i.e. the heavier the load, the greater the braking force.

For the purpose of guiding the pallet 12 as it advances down the trackway 11, guide means are provided at opposite front and rear ends of the pallet 12 at each side thereof for cooperating with the vertical flanges on the rails 18 and 19. As best seen in FIG. 5, the guide means includes guide wheels 40 and 41 mounted for rotation about vertical axes adjacent opposite ends of the frame member 20. Preferably, the guide wheels 40 and 41 are mounted to the horizontal flange 20b of the frame member 20 and are adapted to engage the vertical flange 18a of the angle member 18 as the pallet 12 advances down the trackway 11. A like pair of guide wheels are similarly mounted to the opposite frame member 25 for engaging the vertical flange of the companion rail member 19.

Figure 3:
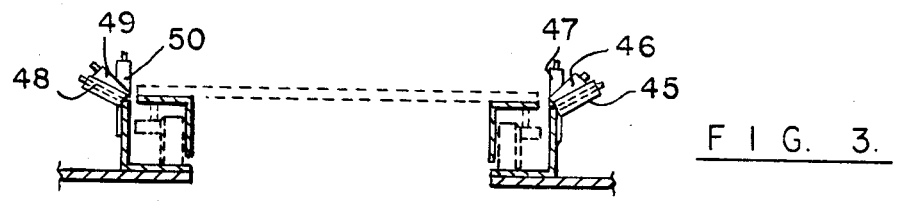
FIGS. 3 and 4 are sectional views taken on lines 3—3 and 4—4, respectively of FIG. 1 to illustrate entryway rollers for centering a pallet during loading into the flow rack.
Figure 4:
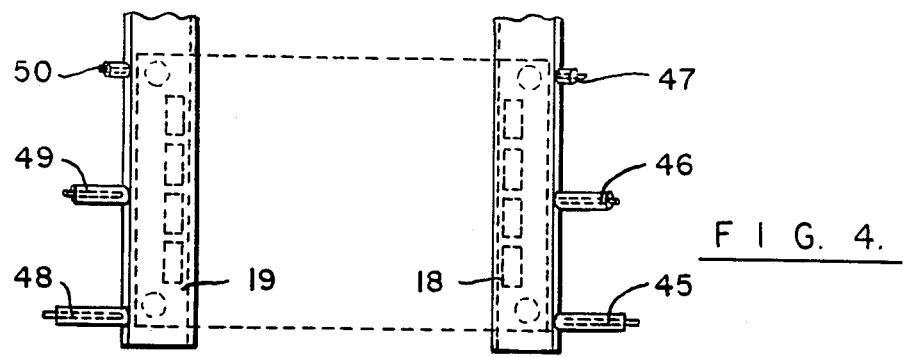

The pallet 12 is automatically centered between the angle members 18 and 19 when placed in the flow rack 10, as by a fork lift truck or stacker crane. For this purpose, a series of entryway roller assemblies are mounted in spaced relation along the rail members adjacent their upper ends at the loading station 11a. As best seen in FIG. 4, a series of three entryway roller assemblies 45-47 are mounted to the right hand rail 18, and a like series of roller assemblies 48-50 are mounted to the left hand rail 19. The roller assemblies are disposed in pairs, such as the pair 45,48, and the pairs of roller assemblies are mounted along the angle members 18 and 19 in divergent relation with the angles of divergence decreasing in the direction of movement of the pallet when loaded into the flow rack 10. For instance, as best seen in FIG. 3, the pair of roller assemblies 45,48 in the foreground diverge at a greater angle than the pair of roller assemblies 47,50 located deeper in the flow rack 10 in the background in FIG. 3. As a result of this angular disposition of the roller assemblies, and their spacing along the rails 18 and 19, the roller assemblies engage opposite edges of a pallet when it is inserted into the flow rack and they thereby assist in centering the pallet between the rails 18 and 19 when lowered by the lift truck as in the direction indicated by the arrow in FIG. 3. The curved surfaces at the front and rear ends of the pallet frame members, such as the surfaces 20c and 20d of the frame member 20, also assist in guiding the pallet into position during loading into the flow rack 10. Thus, pallets can be loaded quickly and easily into the flow rack 10.

According to the present invention, the pallets are gently stopped and separated as they reach the lower end 11b of the trackway 11 in the flow rack 10. To this end, a means is provided in the trackway 11 for engaging the pallet speed control wheels laterally and increasing the axial pressure thereon and thereby increasing the friction force applied by the brake pads to arrest the pallet. As best seen in FIG. 7, the pallet arresting means includes a pair of like arresting bars 60 and 61 similarly mounted in the rail members 18 and 19 adjacent the lower end of the trackway 11b. Each arresting bar, such as the arresting bar 60, is formed with a relatively large dihedral angle with respect to a pivot pin 62. The pivot pin 62 extends downwardly through the horizontal flange 18b of the rail member 18 relatively close to its vertical flange 18a and mounts the arresting bar 60 for rocking motion about a vertical axis. With respect to the pivot pin 62, the arresting bar 60 has a relatively long downstream arm portion 63 and a relatively short upstream arm portion 64. The upstream arm portion 64 terminates in an outturned end 65 extending horizontally through the vertical flange 18a of the rail member 18. The downstream arm portion 63 of the arresting bar 60 has an inwardly offset dogleg portion 66 and a further inturned terminal portion 67 disposed at an angle with respect to the dogleg portion 66.

The downstream portion 63 of the arresting arm 60 is normally disposed in the path of movement of the pallet speed control wheel 21. For this purpose, a helical compression spring 68 is interposed between the outside of the vertical flange 18a of the rail member 18 and a head 69 provided on the outturned end 65 of the upstream arresting bar arm portion 64. The compression spring 68 normally biases the arresting bar 60 counterclockwise about the pivot pin 62 into the full line position illustrated in FIG. 7 wherein the downstream arm portions 63, 66 and 67 of the arresting bar 60 are spaced away from the inside of the vertical flange 18a of the rail member 18 and are disposed in the path of movement of the pallet wheel 21 as it rolls on the horizontal flange 18b of the rail member 18. The companion arresting bar 61 is similarly constructed and mounted in the rail member 19 and functions in the same manner.

In operation, as the lead pallet 12 advances down the rail members 18 and 19, each lead wheel, such as the lower wheel 21 in FIG. 7, engages the downstream arm portion 63 of the arresting bar 60 and pivots the same about the pivot pin 62 through a slight angle. As the pallet continues to move and the wheel 21 continues to roll, it strikes the dogleg portion 66 of the arm, and this, in turn, quickly pivots the upstream arm portion 64 of the arresting bar 60 laterally inward and compresses the spring 68. As the dogleg portion 66 of the arresting bar 60 is forced against the vertical flange 18a of the rail member 18, the axial force on the wheel 21 is quickly and substantially increased. This, in turn, increases the pressure applied to the brake pads 23-26 for increasing the friction force applied to the wheel 21 and thereby slowing the speed of the pallet 12. As the pallet continues to move, the wheel 21 engages the angulated portion 67 of the downstream portion of the arresting bar 60 and this causes further axial pressure to be applied to the wheel 21 to further increase the friction applied by the brake pads. As a result, by the time the pallet 12 has reached the lower end 11b of the trackway 11, a sufficient amount of additional friction will have been applied to the lead wheels 21 of the lead pallet 12 as to have completely arrested the pallet 12 gently but positively. The pallet 12 can then be lifted from the lower end 11b of the trackway 11 by means of a conventional forklift truck.

Figure 8:
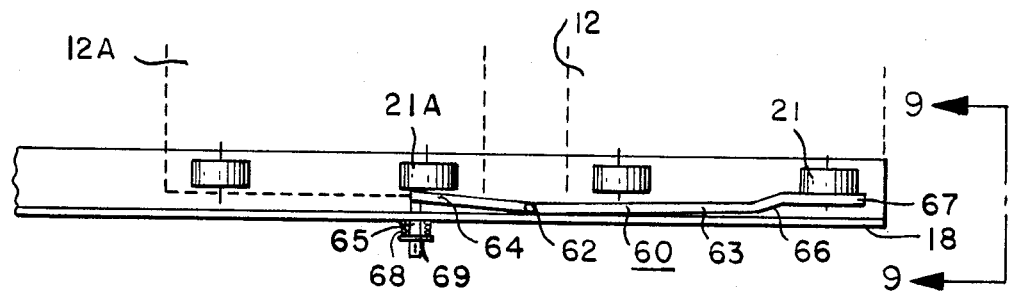
FIG. 8 is a fragmentary view of one of the pallet arresting and separating bars illustrated in FIG. 7, the view illustrating schematically the cooperation of the bar with the speed controller assemblies mounted on the undersides of pallets.

To facilitate unloading the pallet 12 from the trackway 11, it is desirable for it to be separated from any pallet which may have flowed behind it down the trackway 11. For this purpose, the arresting bar 60 also functions to separate the lead pallet 12 from a trailing pallet 12A following the lead pallet 12 down the trackway 11. As best seen in FIG. 7, the pallets 12 and 12A are shown schematically in phantom travelling with the trailing end of the lead pallet 12 engaged with the leading end of the trailing pallet 12A as they advance in the direction indicated by the arrow. To both arrest the pallets 12 and 12A and simultaneously to separate the same, the arresting bar 60 is proportioned so that when the lead wheel 21 of the lead pallet 12 engages the arresting bar dogleg 66, the upstream arm 64 of the arresting bar 60 will have moved laterally inward and engaged the lead wheel 21A of the trailing pallet 12A in the manner illustrated in FIG. 8.

Because the upstream arm 64 is shorter than the downstream arm 63, engagement of the upstream end 64 of the arresting bar 60 with the leading wheel 21A of the trailing pallet 12A causes substantial axial pressure to be applied quickly to the wheel 21A. This quickly increases the friction on the wheel 21A and stops the trailing pallet 12A while permitting the lead pallet 12 to continue moving downwardly in the trackway 11. The lead wheel 21 of the lead pallet 12 advances along the dogleg 66 and terminal portion 67 of the arresting bar 60 and is stopped thereby as described above. Thus, the interaction of the arresting bar 60 with the pallet wheels 21 and 21A causes the pallets, 12 and 12A, respectively, to assume the dotted line positions indicated in FIG. 8 wherein a relatively large space is provided between the trailing end of the lead pallet 12 and the leading end of the trailing pallet 12A. By virtue of this spacing, the lead pallet 12 can be lifted from the lower end 11b of the trackway 11 without interfering with the trailing pallet 12A.

Figure 9:
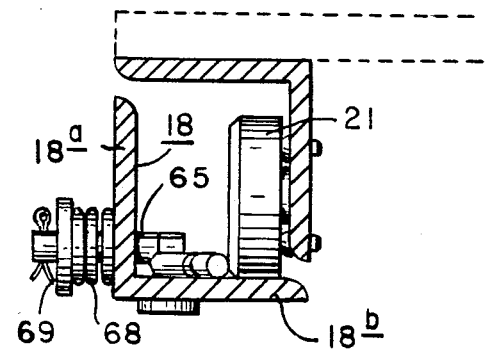
FIG. 9 is an enlarged sectional view taken on line 9—9 of FIG. 8 to illustrate the cooperation of the arresting and separating bar with one of the speed controller assemblies.

As soon as the lead pallet 12 is lifted out of the trackway 11 and removed from the flow rack 10, the outward force on the lower end of the arresting bar 60 is removed, thereby permitting the same to pivot by virtue of the action of the compression spring 68. This repositions the arresting bar 60, and readies the same to arrest the trailing pallet 12A as it travels down the trackway 11 after having been released by virtue of the disengagement of the upstream end 64 of the arresting bar 60 from the lead wheel 21A thereof. Hence, it should be apparent that the arresting and separating means illustrated in FIGS. 7-9 functions in a positive manner to gently arrest pallets as they advance down the trackway and to separate the same for pick-up.

In view of the foregoing, it should be apparent that the present invention has now provided an improved pallet speed control system affording the advantages noted heretofore. In particular, the speed controllers are relatively simple to manufacture, and they run well on conventional rail surfaces provided by conventional shapes. For example, the pallets are capable of running on channels and I-beams, as well as on angles such as illustrated. Moreover, the guide wheels can be located centrally of the pallet for running in a central channel rather than being located at the sides of the pallet as illustrated.

If desired, the speed controllers of the present invention may be embodied in the various arrangements shown in U.S. Pat. No. 4,234,069, the disclosure of which is incorporated by reference herein.

While a preferred embodiment of the present invention has been described in detail, various modifications, alterations and changes may be made without departing from the spirit and scope of the invention as defined in the appended claims.

We claim:

1. A speed retarding mechanism, comprising:
   a frame,
   a rotary member mounted in said frame, means providing an outer tapered surface in said rotary member,
   an axle disposed interiorly of said outer tapered surface,
   means providing an inner tapered surface on said axle confronting said outer tapered surface in said rotary member,
   anti-friction means interposed between said inner and outer surfaces mounting said rotary member for rotation on said axle and for axial movement relative to said axle when a radial load is applied to said rotary member,
   friction producing means carried by said frame and disposed in said axial path of movement of said rotary member for retarding rotation of said rotary member when displaced axially by said load.

2. A mechanism according to claim 1 including a taper bearing having an outer race providing said outer tapered surface, an inner race providing said inner tapered surface, and a plurality of rollers between said races providing said anti-friction means.

3. A mechanism according to claim 1 wherein said outer tapered surface has a large diameter adjacent one side of said rotary member and a small diameter adjacent the other side of said rotary member, and said friction producing means is disposed adjacent to said other side of said rotary member.

4. A mechanism according to claim 1 wherein said friction producing means includes brake pad means carried by said frame radially outward of said axle for engaging one side of said rotary member to apply friction thereto as it rotates under radial load.

5. A mechanism according to claim 1 wherein said anti-friction means includes a series of rollers having inner ends disposed at an angle to said axle and movable in a conical path thereabout, and said friction means produces friction closely adjacent to said plane.

6. A speed retarding mechanism according to claim 1 wherein said frame includes a flange mounting said axle, said rotary member has a side surface confronting said flange, and said friction producing means includes a plurality of brake pads mounted to said flange for engaging said side surface on said rotary member to retard rotation of the same.

7. A speed retarding mechanism according to claim 1 wherein said frame includes an angle member having a depending flange mounting said axle and said friction producing means and having a mounting flange overlying said rotary member and adapted to be fastened to a load support.

8. A speed retarding mechanism according to claim 1 wherein said friction producing means includes a pair of brake pads disposed in vertical alignment on opposite sides of said axle and a pair of brake pads disposed in horizontal alignment on opposite sides of said axle.

9. A speed retarding mechanism according to claim 8 wherein each of said brake pads is fabricated of a plastic composition comprising about 80 percent Acetel, about 10 percent Teflon, and about 10 percent Silicon.

10. A speed retarding mechanism, comprising:
a frame,
means providing a flange on said frame,
an axle extending from a side of said flange,
a wheel mounted on said axle, said wheel having a surface confronting said side of said flange,
means providing a taper roller bearing interposed between said wheel and said axle for mounting said wheel for rotation with respect to said axle and for axial movement thereon toward said side of said flange,
brake pad means carried by said frame between said wheel surface and said flange side and operable in response to axial movement of said wheel to create friction for retarding rotation of said wheel with respect to said flange.

11. A speed retarding mechanism, comprising:
a frame having a flange,
an axle extending from one side of said flange,
a wheel mounted on said axle, said wheel having a braking surface confronting said side of said flange,
a taper roller bearing interposed between said wheel and said axle and mounting said wheel for rotation on said axle and for axial motion thereon toward said flange in response to a radial load,
brake pad means mounted to said one side of said flange for engaging said braking surface of said wheel and creating friction thereagainst as said wheel rotates and axial pressure is applied between the brake pads and the wheel due to the applied radial load.

12. A vehicle for carrying a load down an incline at a controlled rate of speed, comprising:
a deck,
a pair of frame members mounted to said deck,
at least one speed retarder assembly carried by each frame member,
each speed retarder assembly including a wheel, an axle rotatably mounting said wheel, means providing a taper bearing between said wheel and axle to mount said wheel for combined rotary and axial motion about said axle, and brake pad means operable in response to axial motion of said wheel to apply friction thereto for retarding the speed of the vehicle as it advances down the incline, the magnitude of the friction applied to the wheel being directly related to the load carried by the vehicle.

13. A vehicle according to claim 12 including a pair of guide wheels mounted for rotation about vertical axes in spaced relation at opposite sides of said deck with at least one of said speed retarder assemblies mounted therebetween.

14. A vehicle according to claim 13 wherein each said frame member has an L-shaped cross-section with a depending flange mounting said speed retarder assembly and a mounting flange connected to said deck and overlying said speed retarder wheel, said frame members being arranged with their respective speed retarder wheels disposed outboard of their depending flanges, and said pair of guide wheels being rotatably mounted to each frame member mounting flange.

15. A storage system, comprising:
a pair of inclined rails extending in spaced parallel relation between an upper level and a lower level,
a vehicle adapted to travel by gravity on said rails between said levels,
a speed retarder assembly mounted to said vehicle for controlling the velocity of said vehicle as it advances down said rails,
said speed retarder assembly including a wheel, an axle rotatably mounting said wheel, means providing a taper bearing between said wheel and axle to mount said wheel for combined rotary and axial motion about said axle, and brake pad means operable in response to axial motion of said wheel to apply friction thereto for retarding the speed of the vehicle as it advances down the inclined rails with the magnitude of the friction being directly related to the load carried by the vehicle, and
means adjacent said lower level for arresting motion of said vehicle.

16. A storage system according to claim 15 wherein said vehicle arresting means includes means for laterally engaging said speed retarder wheel and applying increased pressure between said wheel and said brake pad means to arrest said motion of said vehicle.

17. A storage system according to claim 16 including separating means located at a higher level than said arresting means and operable in response thereto for laterally engaging the speed retarder wheel of another vehicle travelling down said rails in tandem with said wheel and arresting its motion at said higher level to separate said vehicles.

18. A storage system according to claim 17 wherein said arresting and separating means includes a bar extending lengthwise of at least one rail and formed with a large dihedral angle defining upstream and downstream portions with respect to its apex, and including means mounting said arresting bar for rocking motion about said apex so that when the downstream portion of the arresting bar applies pressure to the speed retarder wheel on said vehicle, the upstream portion deflects outwardly for engaging the speed retarder wheel of another like vehicle travelling in tandem with said vehicle to arrest the trailing vehicle and space its leading end from the trailing end of said vehicle.

19. A storage system according to claim 18 including means biasing the upstream portion of said arresting and separating bar laterally outward of the path of movement of said speed retarder wheel.

20. A storage system according to claim 19 including retainer means loosely receiving said arresting and separating bar adjacent its lower end.

21. A storage system according to claim 15 including means providing a plurality of divergent roller guides adjacent the upper level of said rails for engaging said vehicle and guiding the same downwardly into position on said rails.

22. A storage system according to claim 15 including means providing vertically disposed surfaces extending along each rail and including a pair of guide wheels mounted in spaced fore and aft relation to said vehicle at opposite sides thereof for engaging said surfaces to guide said vehicle down the rails.

* * * * *